United States Patent [19]

Cohen et al.

[11] 3,928,290

[45] Dec. 23, 1975

[54] ENAMELING VARNISHES BASED ON AROMATIC CARBOXYLATES REACTED WITH POLYISOCYANATES AND POLYOLS

[75] Inventors: Choua Cohen, Grenoble; Bruno Durif-Varambon, Eybens; Robert Salle, Rue Pierre Loti; Bernard Sillion, Grenoble, all of France

[73] Assignee: Institut Francais du Petrole, des Carburants & Lubrifiants, Paris, France

[22] Filed: Mar. 12, 1974

[21] Appl. No.: 450,426

[30] Foreign Application Priority Data

Mar. 14, 1973 France .............................. 73.09220

[52] U.S. Cl. ..................... 260/75 TN; 260/18 TN; 260/77.5 NC; 260/838; 260/849; 260/858
[51] Int. Cl.² ......................................... C08G 18/34
[58] Field of Search.... 260/77.5 R, 77.5 AN, 75 TN

[56] References Cited
UNITED STATES PATENTS

| | | | |
|---|---|---|---|
| 2,268,586 | 1/1942 | Gilman............................ | 260/77.5 R |
| 2,293,388 | 8/1942 | Hanford.......................... | 260/77.5 R |
| 2,333,639 | 11/1943 | Christ et al. ................. | 260/77.5 AN |
| 2,333,922 | 11/1943 | Foster.......................... | 260/77.5 AN |

*Primary Examiner*—H.S. Cockeram
*Attorney, Agent, or Firm*—Millen, Raptes & White

[57] ABSTRACT

Polymeric composition resulting from the reaction of:

at least one ester of an aromatic amino-polycarboxylic acid having at least two carboxylic groups, in relative positions other than ortho or peri, and at least one amine function in ortho position with respect to one of the carboxylic groups, at least one ester of an aromatic polycarboxylic acid, having at least two carboxylic groups in relative positions other than ortho or peri, said esters of amino polycarboxylic acids amounting to 20 to 60 % and said esters of polycarboxylic acids amounting to 40 to 80 % of the carboxylic groups, at least one polyisocyanate compound, in a proportion corresponding, in isocyanate equivalents, to 90–200 % of the amine groups; and at least one polyhydroxy compound, at least a part of which consists of at least one polyol containing at least three hydroxy groups, in such a proportion that the sum of the hydroxy groups and amine groups is higher than the sum of the ester groups and isocyanate groups.

18 Claims, No Drawings

ENAMELING VARNISHES BASED ON AROMATIC CARBOXYLATES REACTED WITH POLYISOCYANATES AND POLYOLS

This invention concerns new polymeric compositions, processes for preparing said compositions, the resin mixtures containing said compositions and the solid coatings obtained from said compositions, particularly the coatings of electric metal conductors.

It has already been proposed to use compositions based on polyester-imides as enameling varnishes for electric conductors.

Among others, French Pat. Nos. 1,368,741; 1,478,938; 1,511,961 and 2,009,052, describe the use as varnishes for electric metal wires, of condensation products obtained from acid raw materials containing cyclic imide groups or of condensation products in which imide rings are formed during the condensation process. Some of these compositions result in coatings whose physical, chemical and thermal properties are close to those required for an insulating coating for electric conductors.

It is an object of this invention to manufacture at low cost an insulating material free of imide constituents, whose resistance to heat is sufficient for ensuring a permanent use at 180°C (Class H of insulating materials) and which, in addition, exhibits all the required properties of an electric insulating enamel.

It has been discovered, surprisingly, that a new resin produced by polycondensation of polycarboxylic compounds, amino-polycarboxylic compounds, polyols and polyisocyanates and containing particularly ester, urethane, urea and amide linkages, distributed at random, has all the properties required for an insulating coating of thermal class H.

As a general rule, the polymeric compositions of the invention are obtained by reacting, in solution, the following reactants:

at least one aromatic amino-polycarboxylic acid ester having at least two carboxylic groups in relative positions other than ortho or peri, and at least one amine group, in ortho position with respect to one of the carboxylic groups;

at least one aromatic polycarboxylic acid ester, having at least two carboxylic groups in relative positions other than ortho or peri, said esters of amino-polycarboxylic acids forming from 20 to 60% and said esters of polycarboxylic acids from 40 to 80% of the carboxylic functions;

at least one polyisocyanate compound, in a proportion corresponding, in isocyanate equivalents, to 90–200%, preferably 100–140% of the amine groups; and at least one polyhydroxylated compound, at least a portion of which consistes of at least one polyol containing at least three hydroxy groups, in such a proportion that the sum of the hydroxy groups and amine groups be higher than the sum of the ester groups and isocyanate groups.

The polyisocyanate compound may consist essentially of at least one diisocyanate, but may also further include at least one polyisocyanate having a functionality higher than 2. Thus, for example, the polyisocyanate compound may contain from 20 to 100%, in isocyanate equivalents, of at least one diisocyanate and from 0 to 80% of at least one polyisocyanate of a functionality higher than 2.

The polyhydroxy compound advantageously contains at least one polyol having at least three hydroxy groups and at least one aliphatic or cycloaliphatic diol having from 2 to 10 carbon atoms, the proportion of polyol containing at least three hydroxy groups, corresponding preferably, in hydroxy equivalents, to 35–90% of the carboxylic groups.

The esters of polycarboxylic acids contemplated in this invention are more particularly alkyl esters (preferably lower alkyl esters having for example from 1 to 5 carbon atoms) of aromatic polycarboxylic acids whose carboxylic groups are in relative positions other than ortho or peri. As examples of these compounds, we can mention the lower alkyl esters of such acids as terephthalic-, isophthalic-, diphenyldicarboxylic-, diphenylether-dicarboxylic-, benzophenone-dicarboxylic-, diphenylsulfone-dicarboxylic-, naphthalene-dicarboxylic acids and the lower alkyl esters of trimesic acids, the esters of polycarboxylic acids which are preferred according to the invention being the esters of terephthalic and isophthalic acids.

The esters of amino-polycarboxylic acids are more particularly selected from the lower alkyl esters of aromatic acids containing at least two carboxylic groups in relative positions other than ortho or peri and at least one amine group essentially in ortho position with respect to one of the carboxylic groups. As examples of such compounds we can mention the esters of such acids as: amino-terephthalic-, 2-amino-5-bromo terephthalic-, 2-amino isophthalic-, 2-amino 5-methyl isophthalic, 3-amino 4,4'-diphenyl-dicarboxylic-, 3-amino 4,4'-diphenylether dicarboxylic, 3-amino 4,4'-diphenyl methane dicarboxylic, 4,4'-diamino-3,3'-diphenyl dicarboxylic-, 4,4'-diamino-3,3'-diphenylmethane dicarboxylic-, and 4,4'-diamino-3,3'-diphenylether dicarboxylic acids.

The polyhydroxy compounds are more particularly selected from the substances having alcohol hydroxy groups. As examples of polyols containing at least three hydroxy groups, we may indicate the aliphatic triols, such as glycerol, 1,1,1-trimethylol ethane or 1,1,1 trimethylol propane, the aliphatic tetrols such as pentaerythritol, the aliphatic hexols such as sorbitol or mannitol, or still heterocyclic triols such as tris-(hydroxyethyl)-isocyanurate or tris-(hydroxypropyl)-isocyanurate, the preferred polyol being tris-(hydroxyethyl)-isocyanurate, which will be referred to hereinafter, as T.H.E.I.C.

As examples of aliphatic or cycloaliphatic diols, we may mention ethyleneglycol, 1,4-butanediol, 1,5-pentanediol, neopentylglycol, 1,6-hexanediol, 1,6-trimethylhexanediol or 1,4-cyclohexanediol, the preferred diol being ethyleneglycol.

The polyisocyanate compounds are more particularly selected from the aliphatic, aromatic or heterocyclic polyisocyanates. We can also use, instead of the polyisocyanates themselves, the so-called "blocked" or "protected" polyisocyanates as usually obtained, such for example as the phenol polyurethanes.

As examples of diisocyanates, we can mention the methylene-diisocyanates, of the general formula OCN$-(CH_2)_n-$NCO, wherein $n$ has, for example, a value from 4 to 8, the phenylene-diisocyanates, optionally substituted by alkyl groups or halogen atoms, such as the m, and p, phenylenediisocyanates, 2,4- and 2,6-tolylene diisocyanates; 4,4'-diisocyanato-diphenylmethane, 4,4'diisocyanato-diphenylether, 4,4'-diisocyanatobiphenyle or still the diisocyanato-naphthalenes. Among the polyisocyanates of a functionality higher than 2, we can mention, as examples, the cyclic trimers of 2,4-tolylene diisocyanate, 2,6-tolylene diisocyanate and 4,4'-diisocyanato-diphenylmethane as well as triisocyanato-triphenyl methane or triisocyanato-triphenyl phosphate.

Among the polyisocyanates of a functionality higher than 2, we can mention, as examples, the cyclic trimers of 2,4-tolylene diisocyanate, 2,6-tolylene diisocyanate and 4,4'-diisocyanato-diphenylmethane as well as triisocyanato-triphenyl methane or triisocyanato-triphenyl phosphate.

For preparing the resins according to the invention, the suitable constituents are reacted in convenient proportions, advantageously in a single stage, at temperatures from 150° to 250°C, preferably from 190° to 230°C, in a solvent and in the presence of at least one catalyst.

As solvent, we preferably use the solvents having a boiling point higher than 190°C, such as N-methyl pyrrolidone, cresylic acid, m-cresol, polyaromatic derivatives, halogenated or not, the preferred solvent being cresol.

The catalyst(s) are advantageously selected from the compounds commonly used for favoring the transesterification reaction and the reactions of addition of the isocyanates. These compounds are mentioned in a general way in the article of R. E. WILFONG, Journal of Polymer Science, 1961, 54, 385 with respect to the transesterification catalysts and in the Book entitled "Polyurethanes" of J. H. SAUNDERS and K. C. FRISCH (Interscience Publishers) with respect to the catalysts for the addition of isocyanates.

Among the latter, we use preferably the tetra-alkyl titanates whose alkyl groups contain from 1 to 6 carbon atoms. The solvent amount is generally small: the proportion of dry materials in the reaction medium is most usually from 60 to 90% by weight. The reaction time depends, of course, on the reactants used, their proportions, the selected catalyst and solvent, as well as the temperature; for example, when the reaction is conducted between 190° and 220°C, the heating period is generally from 6 to 20 hours. It is preferable, during the reaction time to allow the volatile compounds formed during the reaction of transesterification (i.e. alcohols) to escape from the reaction medium. They may be recovered, and by determination of their amount it is possible to estimate the advance of the reaction.

The resins of the invention can be used particularly for the manufacture of coatings, particularly varnishes for enameling electric metal conductors.

According to the preparation methods hereabove described, the resins of the invention are generally obtained in the form of solutions in a solvent or in a mixture of solvents, such as those above mentioned.

These solutions constitute base varnishes for the preparation of coating compositions and particularly enameling varnishes for electric metal conductors. These base varnishes may be diluted by addition of one of the above-mentioned solvents or of a mixture of several solvents. They can also be diluted with aliphatic or aromatic hydrocarbons or still with aromatic hydrocarbon cuts having a boiling point preferably higher than 100°C, which are particularly convenient for this use.

In order to improve the usability of the base varnishes, particularly as coatings for electric metal conductors, we may add thereto various agents which are generally adapted to react therewith either at cold, or under heating, for example for a period of from 1 to 4 hours, at temperatures from 90° to 180°C.

Accordingly, we can add to the base varnish an alkyl titanate such as above defined, for example in a proportion of 0.1 to 10% by weight.

We can also add to the varnish, in a proportion of from 1 to 15% by weight, a polyisocyanate such as, for example, a so-called blocked triisocyanate obtained by trimerization of 2,4-tolylene-diisocyanate such as, among others, those known under the trade marks "Mondur S", "Demondur CTS" and "Mondur SH".

Sometimes we can also add, for example in a proportion of 0.05 to 2% by weight, a metal drying agent such for example as a metal acetyl-acetonate, octoate or naphthenate.

It may be advantageous to incorporate to the varnish, for example in a proportion of from 1 to 15% by weight, a phenol-aldehyde resin, such for example as a phenol-formaldehyde resin, a cresol-formaldehyde resin or still a melamine-formaldehyde resin.

By addition of biphenyl, for example in a proportion of from 0.5 to 2.5% by weight, it is possible, in some cases, to improve the state of the surface of the coating obtained from the varnishes.

The above-indicated proportions are expressed as the ratio by weight of the additive to the weight of dry material of the varnish.

The method for enameling electric metal conductors by means of said varnishes is any conventional technique.

The qualities of the enameled conductors may be tested according to the following methods:

Their flexibility is determined by subjecting them to a preliminary lengthening and subsequently winding them around their own diameter (Test of Mandrin 1 X). The maximum lengthening that the wire can withstand before passing with success the winding test — without breaking the enamel layer — represents the flexibility of the enamel. It is expressed in %.

The thermal endurance of the enamel is tested at 250°C according to standard A.I.E.E. No 57.

The following examples are given for illustrative purpose and are by no way to be considered as limiting the scope of the invention.

EXAMPLE 1

In a glass reactor of a 60 liter capacity, heated by thermofluid and provided with a stirrer and a column for the distillation of the formed volatile products, we introduce 6,788 g of methyl terephthalate, 3,252 g of methyl amino-terephthalate, 1,947 g of 4,4'-diisocyanato-diphenylmethane, 7,135 g of T.H.E.I.C., 1,444 g of ethyleneglycol, 86 g of isopropyl titanate and 2,790 cc of cresol, while proceeding under inert atmosphere.

We heat at 200°–205°C under stirring for 6 hours; methanol distills very quickly at the beginning; we recover 3560 cc of distillate; the reaction is continued by increasing the temperature to 225°–230°C. The viscosity of the medium increases and we further distill 120 cc of methanol, then we add 24.65 kg of cresol and the temperature is maintained for 1 hour at 200°C; then we add 9.178 kg of "Solvesso 100" while maintaining the temperature for 1 hour at 120°C and then we filter on a paper filter.

By this way, we obtain a homogeneous, brown solution, having a viscosity of 590 cst at 30°C and containing 30.7% by weight of dry extract.

a. To a portion of solution I, we add:

10% of Desmodur CTS and 1% of butyl titanate (% expressed by weight with respect to the dry extract) and we use the resulting solution, after homogenization thereof at 100°C, for enameling a copper wire of a 0.8 mm diameter; after 6 coatings, the enameled wire has a diameter of 0.87 mm, it is smooth and bright, its flexibility ranges from 12.5 to 15%.

b. To a second portion of solution I, we add 4% of diisocyanato-diphenyl-methane and 1% of butyl titanate or 0.5% of zinc octoate; while operating as under paragraph (a), we obtain an enameled wire whose flexibility is higher than 17.5%.

c. To a third portion of the solution I, we add 7% of Desmodur CTS, 1% of butyl titanate and 6% of phenol-formaldehyde resin and we stir for 3 hours at 120°C. While operating like under paragraph (a) we obtain an enameled wire having a flexibility of 20%.

The tests (a), (b), (c) give wires having a good resistance to abrasion, a good adherence and a life time of more than 1,000 hours at 250°C.

EXAMPLE 2

In a reaction vessel of a 2 liter capacity, provided with several pipes and equipped with a good stirrer and a discharge tube for recovering the distillates, we condense together in the absence of air:

78.8 g of methyl amino-terephthalate, 42.8 g of 4,4'-diisocyanato-diphenyl ether, 174 g of T.H.E.I.C., 35.2 g of ethyleneglycol, 165.5 g of methyl terephthalate, 2.1 g of isopropyl titanate and 70 g of cresol. We heat the whole, under stirring, in an oil bath at 210°C for 5 hours, then for 1 hour and a half at 230°C; and we dilute with 671 g of cresol and homogenize the mixture for 1 hour at 200°C; the temperature is then lowered to 120°C and we add 224 g of Solvesso 100, we stir for 1 hour at this temperature, and then we add 16 g of diisocyanato-diphenyl-methane and 4g of butyl titanate, we stir again, filter and cool.

The solution thus obtained is of a brown color, it has a viscosity of 542 cst and 31.2% by weight concentration of dry material. We use said solution for coating a cooper wire 0.8 mm diameter; after 6 layers, the enameled wire has a diameter of 0.86 mm, a flexibility of 20–22% and a life time at 250°C longer than 1 200 hours.

EXAMPLE 3

We operate under the same conditions as in example 2 by reacting together:
- 45.8 g of methyl amino-terephthalate
- 97 g of methyl terephthalate
- 74.2 g of T.H.E.I.C.
- 27.5 g of 4,4'-diisocyanato-diphenyl-methane
- 30 g of ethyleneglycol
- 33.5 g of cresol
- 1 g of butyl titanate We heat the mixture while stirring at 200°–205°C for 5 to 7 hours, and then at 220°–230°C for 1 to 2 hours.

We then dilute with 319 g of cresol and, at 120°C, with 117 g of Solvesso 100. Then we further add 2 g of butyl titanate and 20 g of Desmodur CTS. After filtration, we obtain a homogeneous solution having a viscosity of 732 cst at 30°C; this solution is used for enameling a copper wire of a 0.8 mm diameter; the obtained enameled wire has a flexibility of 20% and a life time of more than 900 hours at 250°C.

EXAMPLE 4

We operate under the same conditions as in Example 2, by reacting together:
- 62.7 g of methyl amino terephthalate
- 97 g of methyl terephthalate
- 107 g of T.H.E.I.C.
- 47.5 g of 4,4'-diisocyanato-diphenyl-methane
- 22 g of ethyleneglycol
- 43.6 g of cresol
- 1.3 g of butyl titanate We heat the mixture while stirring at 200°–205°C for 5 to 7 hours and then at 220°–230°C for 1 to 2 hours.

We dilute the mixture with 388 g of cresol and then, at 120°C, with 144 g of Solvesso 100. We then further add 2.5 g of butyl titanate.

After filtration, we obtain a homogeneous solution having a viscosity of 954 cst at 30°C.

This solution is used for enameling a copper wire having a 0.8 mm diameter, the obtained enameled wire has a flexibility of 12% and a life time longer than 1,000 hours at 250°C.

EXAMPLE 5

We operate under the same conditions as in example 2, by reacting together:
- 125.4 g of methyl amino-terephthalate
- 194 g of methyl terephthalate
- 135.7 g of T.H.E.I.C.
- 75 g of 4,4'-diisocyanato-diphenyl-methane
- 80 g of ethyleneglycol
- 74 g of cresol
- 2.3 g of butyl titanate We heat the mixture, while stirring, at a temperature of 200°–205°C for 5 to 7 hours, and then, at 220°–230°C for 1 to 2 hours.

We dilute with 696 g of cresol and then, at 120°C, with 256 g of Solvesso 100. We then add 4.5 g of butyl titanate and 45.7 g of Desmodur CTS. After filtering, we obtain a homogeneous solution having a viscosity of 613 cst at 30°C. This solution is used for enameling a copper wire of a 0.8 mm diameter; the obtained enameled wire has a flexibility of 15% and a life time longer than 1,000 hours at 250°C.

EXAMPLE 6

We operate under the same conditions as in example 2, by reacting together:
- 58.5 g of methyl amino-terephthalate
- 194 g of methyl terephthalate
- 103 g of T.H.E.I.C.
- 35 g of 4,4'-diisocyanato-diphenyl-methane
- 69 g of ethyleneglycol
- 50 g of cresol
- 1.7 g of butyl titanate We heat, under stirring, at 200°–205°C for 5 to 7 hours, and then at 220°–230°C for 1 to 2 hours.

We dilute with 523 g of cresol and then, at 120°C, with 191 g of Solvesso 100. We further add 3.4 g of butyl titanate and 34.3 g of Desmodur CTS. After filtration, we obtain a homogeneous solution whose viscosity is 477 cst. We use this solution for enameling a copper wire of a 0.8 mm diameter; the enameled wire has a flexibility of 20% and a life time at 250°C longer than 700 hours.

In the above examples, the product referred to under the trade mark Solvesso 100 is a mixture of hydrocarbon solvents and the product referred to under the trade mark Desmodur CTS is a trimer of 2,4-diisocyanato-tolylene, blocked with phenol.

We claim:

1. A polymeric composition obtained by reacting simultaneously in solution:

a. at least one ester of an aromatic aminopolycarboxylic acid having at least 2 carboxylic groups, in relative position other than ortho or peri, and at least one amine function in ortho position with respect to one of the carboxylic groups;

b. at least one ester of an aromatic polycarboxylic acid, having at least two carboxylic groups in relative positions other than ortho or peri, with the provision that of the total of carboxylic acid groups of (a) and (b), said at least one ester of an aromatic amino polycarboxylic acid amounts to 20 to 60% of said total and said at least one ester of an aromatic polycarboxylic acid amounts to 40 to 80% of said total;

c. at least one polyisocyanate compound, in a proportion corresponding, in isocyanate equivalents, to 90–200% of the amine groups; and d. at least one polyhydroxy compound, at least a part of which consists of at least one polyol containing at least three hydroxy groups, in such a proportion that the sum of the hydroxy groups and amine groups is higher than the sum of the ester groups and isocyanate groups.

2. A composition according to claim 1, in which the esters of amino-polycarboxylic acids and polycarboxylic acids are lower alkyl esters.

3. A composition according to claim 2, in which the lower alkyl ester of amino-polycarboxylic acid is a lower alkyl ester of amino-terephthalic acid, 2-amino-5-bromo-terephthalic acid, 2-amino-isophthalic acid, 2-amino-5-methyl-isophthalic acid, 3-amino-4,4'-diphenyl-dicarboxylic acid, 3-amino-4,4'-diphenylether-dicarboxylic acid, 3-amino-4,4'-diphenylmethane-dicarboxylic acid, 4,4'-diamino-3,3'-diphenyl-dicarboxylic acid, 4,4'-diamino-3,3'diphenyl-methane-dicarboxylic acid or 4,4'-diamino-3,3'-diphenyl-ether-dicarboxylic acid; and the lower alkyl ester of the polycarboxylic acid is a lower alkyl ester of terephthalic acid, isophthalic acid, diphenyl-dicarboxylic acid, diphenyl-ether-dicarboxylic acid, benzophenone dicarboxylic acid, diphenylsulfone-dicarboxylic acid, naphthalene-dicarboxylic acid or a lower alkyl ester of trimesic acid.

4. Composition according to claim 1, in which the proportion of the polyisocyanate compounds corresponds in isocyanate equivalents, to 100–140 % of the amine groups.

5. Composition according to claim 1, in which the polyisocyanate compound comprises at least one diisocyanate selected from the group consisting of: the polymethylenediisocyanates of the general formula

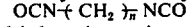

in which n is an integer, the phenylene-diisocyanates, the phenylene diisocyanates substituted with alkyl groups or halogen atoms, 4,4'-diisocyanato-diphenylmethane, 4,4'-diisocyanato-diphenyl ether, 4,4'-diisocyanato-biphenyl and the diisocyanato-naphthalenes.

6. Composition according to claim 5, in which the polyisocyanate compound further comprises at least one polyisocyanate having a functionality higher than 2.

7. Composition according to claim 1, in which the polyhydroxy compound comprises at least one polyol containing at least three hydroxy groups and at least one aliphatic or cycloaliphatic diol containing from 2 to 10 carbon atoms and in which the proportion of polyol containing at least three hydroxy groups corresponds, in hydroxy equivalents, to 35–90 % of the carboxylic groups.

8. A composition according to claim 1, in which the polyol containing at least three hydroxy groups is selected from glycerol, 1,1,1,-trimethylol ethane, 1,1,1-trimethylolpropane, pentaerythritol, sorbitol, mannitol, tris-(hydroxyethyl)-isocyanurate and tris-(hydroxypropyl)-isocyanurate.

9. A composition according to claim 7, in which the diol is selected from ethyleneglycol, 1,4-butanediol, 1,5-pentanediol, neopentylglycol, 1,6-hexanediol, trimethyl-1,6-hexanediol and 1,4-cyclohexanediol.

10. A composition according to claim 1, in which the reaction is conducted at a temperature of from 150° to 250°C in the presence of a catalyst.

11. A composition according to claim 1, as obtained by the reaction of:
methyl amino-terephthalate
methyl terephthalate
these two esters corresponding respectively to 20 to 60 % and to 40 to 80 % of the ester groups,
at least one polyisocyanate compound selected from the group consisting of 4,4'-diisocyanato-diphenylmethane and 4,4'-diisocyanato diphenylether, in a proportion corresponding, in isocyanate equivalents, to 90–200 % of the amine groups, and
a polyhydroxy compound containing tris-(hydroxyethyl)-isocyanurate and ethyleneglycol in such a proportion that the sum of the hydroxyl groups and amine groups is higher than the sum of the ester groups and the isocyanate groups.

12. A composition according to claim 1, further diluted with a solvent or a mixture of solvents.

13. A composition according to claim 1, which is further reacted with a proportion of 1 to 15 % by weight of at least one polyisocyanate.

14. A composition according to claim 1, further containing a metal drying agent.

15. An electric conductor enameled by means of a composition according to claim 1.

16. A composition according to claim 3, in which the polyol containing at least three hydroxy groups is selected from glycerol, 1,1,1-trimethylol ethane, 1,1,1-trimethylolpropane, pentaerythritol, sorbitol, mannitol, tris-(hydroxyethyl)-isocyanurate and tris-(hydroxypropyl)-isocyanurate; and wherein the polyisocyanate compound is 4,4'-diisocyanato-diphenylmethane or 4,4'-diisocyanato diphenyl ether.

17. A composition according to claim 10 wherein polyisocyanate compound is 4,4'-diisocyanato-diphenyl ether.

18. A composition according to claim 10, wherein the polyisocyanate compound is 4,4'-diisocyanato-diphenyl methane.

* * * * *